United States Patent [19]
O'Conner et al.

[11] Patent Number: 6,115,476
[45] Date of Patent: Sep. 5, 2000

[54] ACTIVE DIGITAL AUDIO/VIDEO SIGNAL MODIFICATION TO CORRECT FOR PLAYBACK SYSTEM DEFICIENCIES

[75] Inventors: Dennis M. O'Conner, Chandler; Joe D. Jensen, Tempe, both of Ariz.

[73] Assignee: Intel Corporation, Santa Clara, Calif.

[21] Appl. No.: 09/109,259

[22] Filed: Jun. 30, 1998

[51] Int. Cl.⁷ .................................................. H04N 17/00
[52] U.S. Cl. ........................... 381/103; 348/180; 348/607
[58] Field of Search ..................... 381/103; 348/177–181, 348/189–191, 614, 607, 611; 375/229, 230, 231, 232, 233; 455/226.1, 67.4, 67.3, 67.1; H04N 17/00

[56] References Cited

U.S. PATENT DOCUMENTS

| | | | |
|---|---|---|---|
| 4,628,530 | 12/1986 | Op De Beek et al. | 381/103 |
| 4,748,669 | 5/1988 | Klayman | 381/1 |

FOREIGN PATENT DOCUMENTS

| | | | |
|---|---|---|---|
| 2233866 | 1/1991 | United Kingdom | H04N 17/00 |
| 0020194 | 11/1992 | WIPO | H04N 17/00 |

*Primary Examiner*—David E. Harvey
*Attorney, Agent, or Firm*—Gene Su

[57] ABSTRACT

A method and apparatus for monitoring an output signal from and modifying an input signal to an audio/video system is disclosed. In one embodiment, the system response of said audio/video system is determined. After having established the system response, said input signal is modified according to said system response such that said output signal is a optimal reproduction of said input signal.

22 Claims, 5 Drawing Sheets

ACTIVE DIGITAL AUDIO/VIDEO SIGNAL MODIFICATION TO CORRECT FOR PLAYBACK SYSTEM DEFICIENCIES

FIELD OF THE INVENTION

The present invention relates to an apparatus which monitors and modifies input and output signals of an audio/video system. The monitoring and modification of signals compensate for imperfections in speakers, listening spaces and other elements of an audio/video system.

BACKGROUND OF THE INVENTION

The quality of sound and video experienced in home entertainment systems or other audiovisual systems today is mostly determined by the quality of the components in the final stage of the signal path: the speakers and the display devices. These devices often are the main sources of infidelity in the audio/video reproduction. One reason is because these devices are open-loop systems. In other words, they do not have feedback mechanisms to compensate for variations and limitations in the transducers employed and the interaction of the transducers with the environment. Another reason is that these final stage devices commonly adhere to less stringent design specifications due to the prohibitively lofty costs associated with building high fidelity components.

Using high fidelity speakers as an illustration, an ideal speaker driver contains a magnet/voice (motor) assembly that perfectly converts an analog electrical signal into a particular force. This force then generates specific mechanical motion that quickly and accurately moves and stops the speaker cone in order to reproduce the identically shaped sound wave. Needless to say, in order to achieve such complex conversion from electrical signals to such precise mechanical motions, not only is much calibration most likely required, but parts specifically constructed to create particular amount of mechanical movements in the speakers are also needed.

There have been attempts to improve the final sound and video output quality. Some efforts focused on building even better and more precise speakers or display devices. Other efforts focused on generating sum and difference signals and using such signals to produce enhanced stereo signals. Yet other efforts focused on designing accurate equalizers where a particular signal's amplitudes within specific frequency ranges are either attenuated or boosted. Still others efforts involve having a trained technician apply audio test signals (i.e. tone bursts, sweep tones, white and pink noise, etc.) and video test signals (i.e. crosshatch, color bars, arrays of dots, etc.) to an audio/video equipment, compare the resulting output with the expected output, and manually adjust the audio/video equipment according to the comparison.

With the proliferation of high speed processors, real time execution of many signal or image processing algorithms is now possible. Since readily available semiconductor memories and non-volatile storage devices are capable of storing massive amount of data for long periods of time, the algorithms can be employed even when a significant delay exists between applying a signal to the input of the system and the effect of that signal on the output of the system. As a result, an apparatus or a general purpose computer system can deploy some of these signal or image processing techniques to actively monitor and correct the input signals of an audio/video system. When these input signals are modified to compensate for the shortcomings in both the intermediate and final stages of audio/video reproduction, the resulting audio/video output from inexpensive systems is capable of rivaling the output from high fidelity, but costly, audio/video systems.

SUMMARY OF THE INVENTION

A method and apparatus for monitoring an output signal from and modifying an input signal to an audio/video system is disclosed. In one embodiment, the system response of said audio/video system is determined. After having established the system response, said input signal is modified according to said system response such that said output signal is a optimal reproduction of said input signal.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus for monitoring and modifying input and output signals of an audio/video system is disclosed. In the following description, specific details are set forth such as trigger events in order to provide a thorough understanding of the present invention. However, it will be apparent to one of ordinary skill in the art that the invention may be practiced without these particular details. In other instances, well known elements such as discrete Fourier Transform, Fast Fourier Transform, convolution, frequency domain, time domain and linear time-invariant systems have not been explained in special details in order to avoid unnecessarily obscure the present invention.

Figure 1:
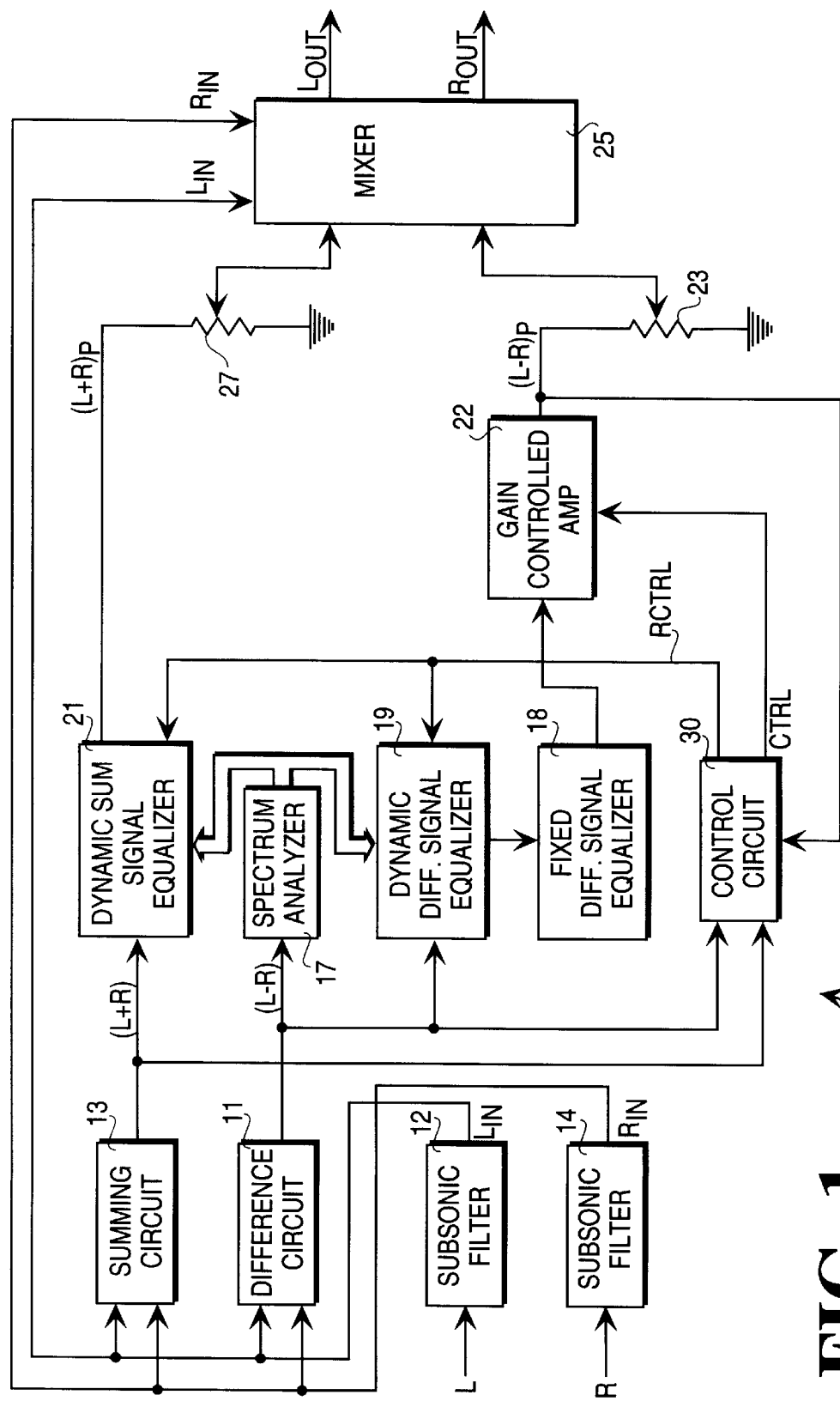
FIG. 1 illustrates a block diagram of a prior art method for dynamically enhancing stereo images.

FIG. 1 illustrates a block diagram of Klayman's (U.S. Pat. No. 4,748,669, issued on May 31, 1988, column 7, lines 5–7) method and apparatus for providing for dynamic equalization of the sum and difference of left and right stereo signals to achieve a wider stereo image and a wider listening area. Furthermore, a dynamic difference signal equalizer 19, a fixed difference signal equalizer 18, and a gain controlled amplifier 22 cooperate to selectively alter or modify the relative amplitudes of the difference signal frequency components (also referred to herein as "components" or "frequencies") to provide a processed difference signal $(L-R)_p$ (Klayman, column 7, lines 12–18). A similar method is applied to provide a processed sum signal $(L+R)_p$ (Klayman, column 7, lines 18–22).

Figure 2:
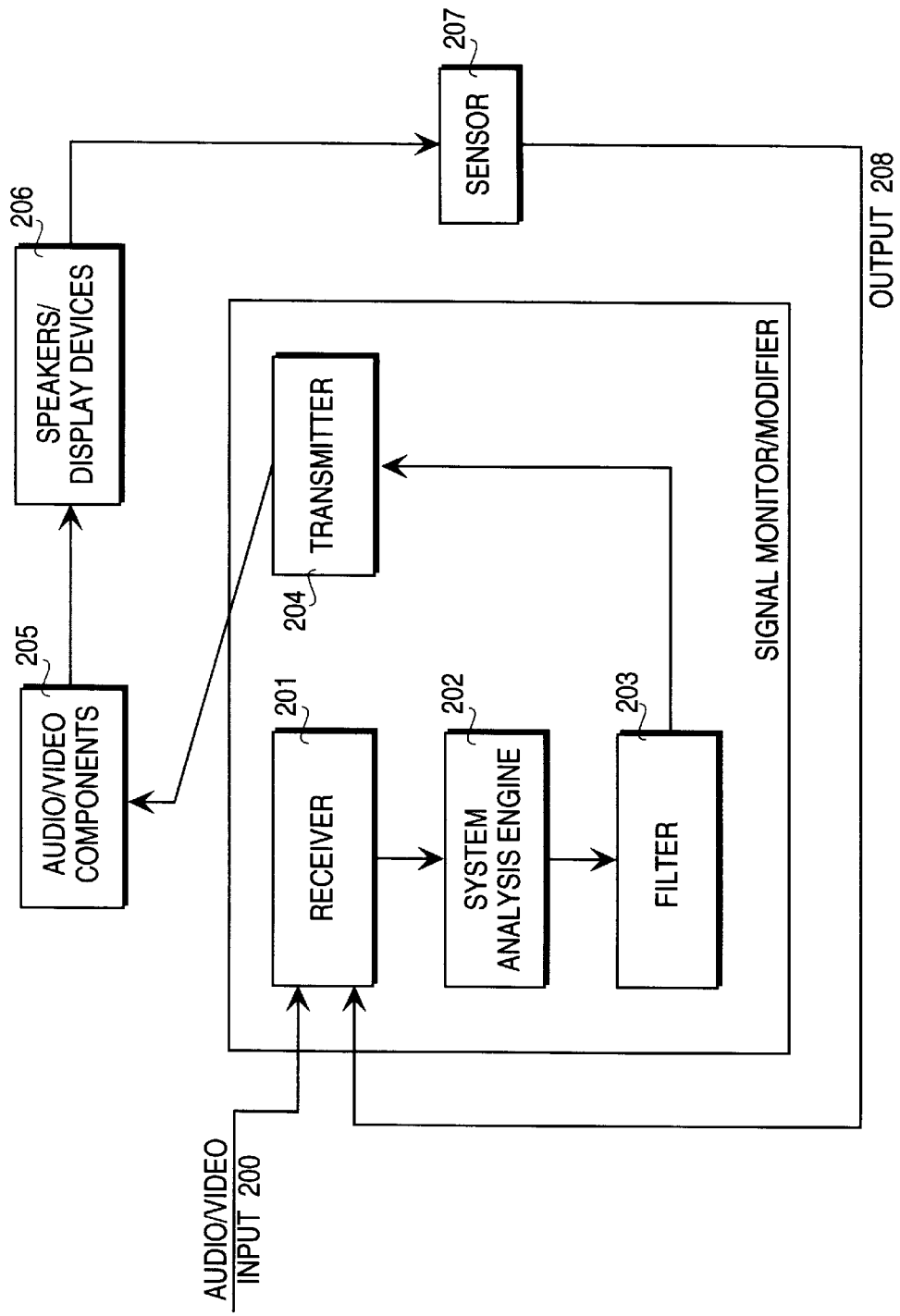
FIG. 2 illustrates a block diagram for the present invention.

FIG. 2 demonstrates a block diagram of the present invention. Instead of focusing on summing and subtracting the left and right channels of an audio system, the present invention covers all audio/video channels of an audio/video system and adaptively modifies appropriate input signals to the audio/video system to compensate for any playback deficiencies. These deficiencies may be in the frequency domain of the audio output, or in the geometry, luminance or color of the video output. FIG. 2 is described in more detail below.

Another unique feature of the present invention is its active monitoring and modification scheme. Unlike Klayman's methods of modifying an output signal prior to playing back the signal, such as attenuating or boosting signal amplitudes at certain frequencies or filtering out output signal within certain frequency, the invention at hand modifies input signals. In particular, the present invention monitors the system characteristics of an audio/video system. When appropriate, the audio/video system's input signals are altered to adapt to the corresponding system characteristics. Consequently, as long as the system response is well-characterized, even an inexpensive set of audio/video equipment is capable of producing excellent quality audio/video output.

Figure 3:
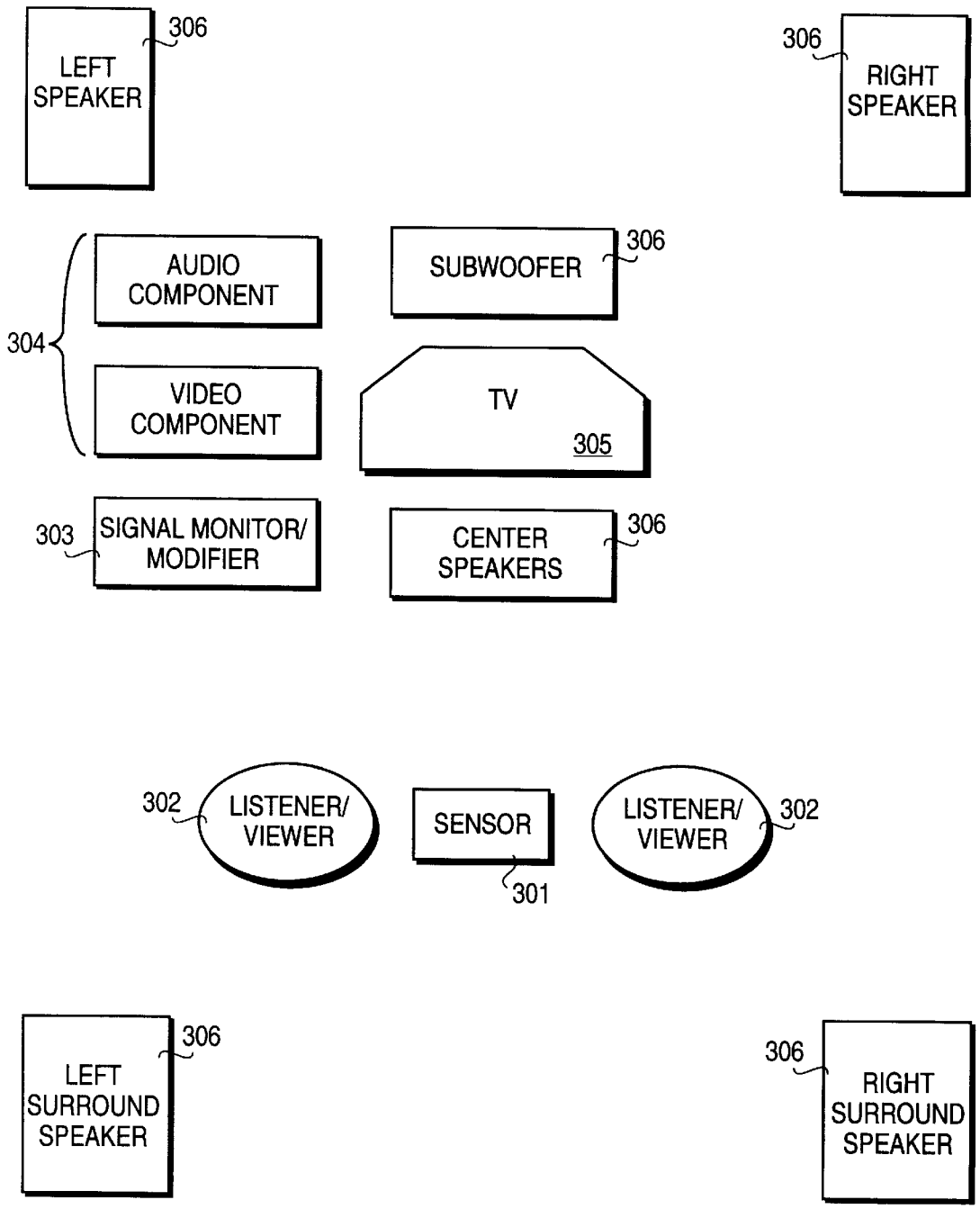
FIG. 3 illustrates an example of how the present invention can be used.

FIG. 3 illustrates a home theater setting in which the present invention is used. In one embodiment, feedback sensor 301, consisting of a video camera and one or more microphones, monitors the audio/video output from the listeners/viewers' 302 perspective. Signal monitor/modifier 303 then compares the recorded output signal to the input signal of audio/video components 304, while taking into account the time delay inherent in the signal's transversal of the system. In particular, the substantial delay in the video signal requires special attention. This delay is caused by the transformation of video information from a one-dimensional time-varying signal to a two-dimensional display. In order to overcome the delay, monitor/modifier 303 must therefore have high speed storage capabilities to store tens of milliseconds worth of original input video signal for its comparison step. Similarly, the audio delay between speakers 306 and listeners/viewers 302s' also demands high speed storage capabilities in monitor/modifier 303. After the output signal is compared to the input signal, when appropriate, signal monitor/modifier 303 alters the input signal of audio/video components 304 and result in improved visual images on TV 305 and sound from speakers 306.

It should be noted that FIG. 2 illustrates the block diagram of the present invention having been implemented or programmed in an apparatus or a general purpose computer system. Such an apparatus or a computer system architecture for one embodiment of the present invention is further illustrated in FIG. 4.

Figure 4:
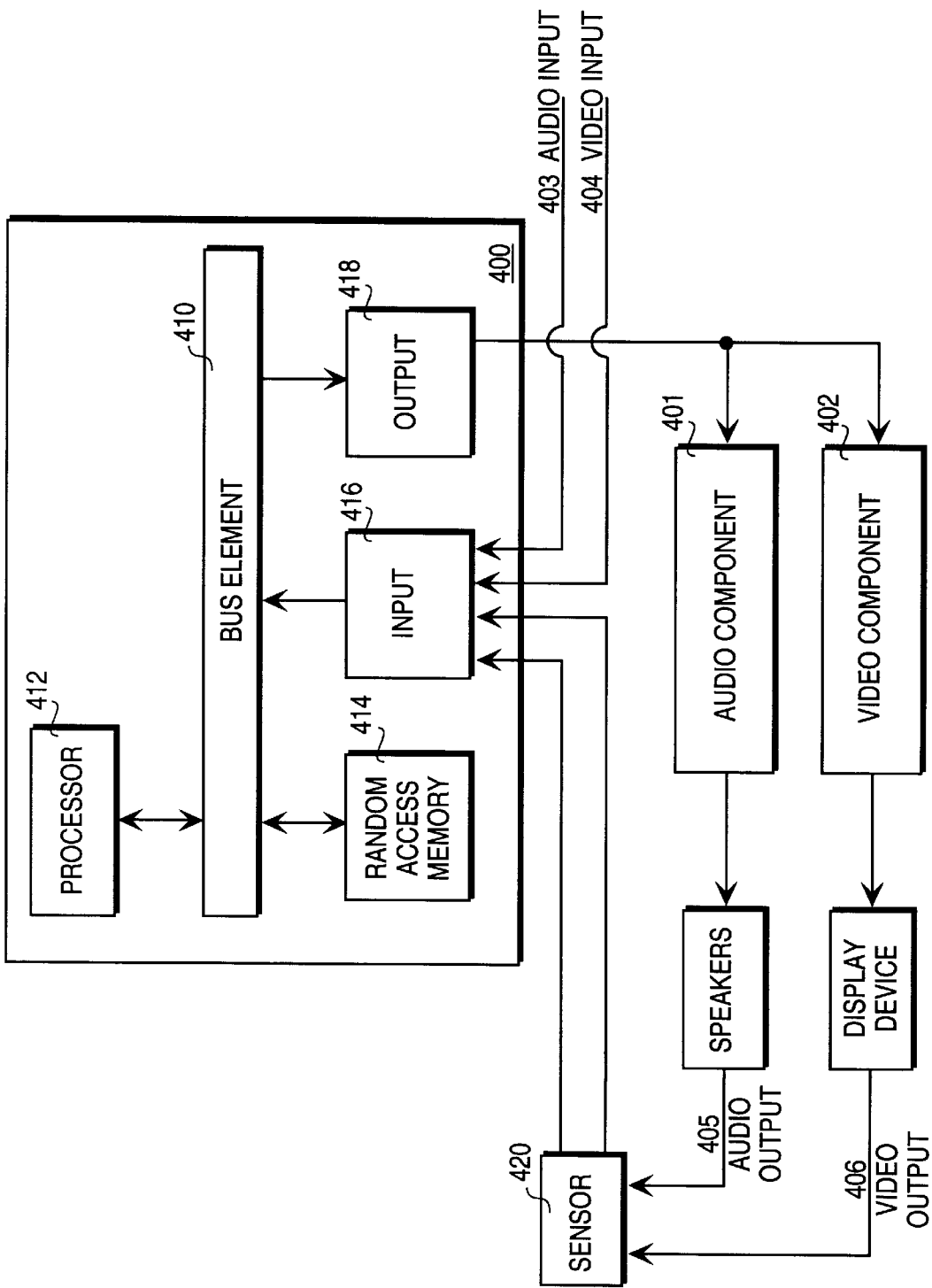
FIG. 4 illustrates the configuration of one embodiment of the present invention.

Referring to FIG. 4, the system architecture comprises a bus element 410 for communicating information, a processor 412 coupled with said bus element 410 for processing information, a random access memory 414 coupled with said bus element 410 for storing static information and instructions for said processor 412, an input device 416 coupled to said bus element 410 for receiving external information into said apparatus or said general purpose computer system such as audio input 403, video input 404, audio output 405, video output 406 and sensor 420, and an output device 418 coupled to said bus element 410 for communicating processed information to systems external to said apparatus or said general purpose computer system such as audio component 401 and video component 402. It should be further noted that sensor 420 can either be separate audio/video sensors in different housings or one combined sensor capable of detecting both audio/video in one housing. Sensor 420 can also be part of input device 416.

Audio component 401 typically consists of a preamplifier, a decoder and an amplifier. After the decoder separates out the distinct signals for different channels (i.e. left, right, center, left surround, and right surround), the amplifier drives these electrical signals to their corresponding speakers. Speakers then convert the electrical signal to appropriate mechanical motion and produce audio output 405. On the other hand, video component 402 often is a video buffer/switch subsystem of an audio/video receiver or a video-input subsystem of a display device. Video input 404 contains signals from sources such as a video cassette player, a Laser Disc player or a DVD player and feeds into input device 416. After having performed the necessary processing on the received video information, output 418 transmits the modified signal or commands to video component 402. When display device receives the output from video component 402, the device then plays back video output 406.

OPERATION OF THE PRESENT INVENTION

The current invention is a method and apparatus for monitoring an output signal and modifying an input signal of an audio/video system. One aspect of the invention makes use of digital signal processing principles. Briefly, when a signal is operating in the time domain, its amplitude is represented as a function of time. A time domain system response can be characterized by a system's response to an impulse input of infinitesimal duration and unit amplitude. On the other hand, the frequency domain relates the time domain by well-known mathematically relationships such as the Fourier Transforms and the like. Furthermore, by modeling a home theater system as depicted in FIG. 3 as a linear time-invariant system, an audio/video component's system response in the time domain can convolute with another component's to formulate a combined system response for both components. With the linear time-invariance assumption, since convolution in the time domain directly translates to the multiplication in the frequency domain, the overall system response of two separate components in the frequency domain can thus be determined by multiplying one component's system response by the other.

One embodiment of the invention is a general purpose computer system containing various components as illustrated in FIG. 2. Generally, receiver 201 in the computer system intercepts audio/video input signal 200 before the signal reaches audio/video components 205. At the same time, receiver 201 also receives audio/video output signal 208 from sensor 207 which captures the signal from speakers/display devices 206. Both audio/video input signal 200 and output signal 208 are fed into system analysis engine 202, where the signals' frequency responses both in terms of amplitude and delay are calculated using well-known algorithms such as discrete Fourier Transform computation algorithms.

In addition to determining frequency responses, system analysis engine 202 also calculates information such as display device 206's geometric distortions, overscan or underscan, and sound delay from speakers 206 to sensor 207. Based on the computed frequency responses and other system characteristics, engine 202 proceeds to formulate the combined system response comprising the system responses for audio/video components 205, speakers/display devices 206 and sensor 207. Once the overall system response is established, filter 203 equals to the inverse of the system response.

It should be noted that the response of sensor 207 is most likely known or predetermined prior to establishing the combined system response. Additionally, since modeling a home theater system as a linear time-invariant system is a mere approximation, engine 202 also utilizes methods other than the aforementioned digital signal processing techniques to determine the system response. For example, engine 202 may perform a pixel by pixel comparison between the output of sensor 207 and the expected values from input 200. Any discrepancy resulting from the comparison of various pixel attributes, such as pixel coordinates, color or luminosity values, formulates system responses corresponding to each of these attributes. If these system responses introduce geometric, color and luminosity distortions to the system, filter 203 then attempts to reverse such distortions.

After having determined filter 203, audio/video input 200 is modified by filter 203, and the modified signal is sent to transmitter 204 for transmission to audio/video components 205. In an alternative embodiment of the present invention, transmitter 204 sometimes transmits commands, instead of the modified signal, to audio/video components 205. Specifically, these commands prompt necessary adjustments, such as tone, saturation or balance in audio/video components 205 to generate an output which models the output derived from the modified signal. In addition, these described adjustments can be performed either by audio/video components 205 automatically or by the user manually. In one embodiment employing manual adjustments, signal monitor/modifier has a command display that directs the user to modify the audio/video components' settings and configurations Because the modified signal has adapted to the overall system response, the new output 208 derived from the modified signal becomes the optimal reproduction of the original audio/video input 200. The following mathematical equations will further clarify the relationships among the components in FIG. 2:

Assume audio/video components 205, speakers/display devices 206 and sensor 207 are all linear time-invariant systems.

Frequency response of audio/video input 200 is denoted as I.

Frequency response of output signal 208 is denoted as O.

System response of audio/video components 205 is denoted as $H_1$.

System response of speakers/display devices 206 is denoted as $H_2$.

System response of sensor 207 is denoted as $H_3$.

Frequency response of filter 203 is denoted as F.

Equation 1: Overall system response is the multiplication of $H_1$, $H_2$ and $H_3$ (or $H_1 * H_2 * H_3$).

Equation 2: The signal which transmitter 204 sends to audio/video components 205 is $I*F$.

Equation 3: Overall system response is also $=O/(I*F)$ or $H_1*H_2*H_3$ as in Equation 1.

Equation 4: The goal is to achieve O=I.

Since $O/(I*F)=H_1*H_2*H_3$, and if $F=1/(H_1*H_2*H_3)$, then O=I.

On the other hand, even without the linear time-invariance assumption, a different set of equations can also describe the relationships among the same components as indicated above.

audio/video input 200 is denoted as i.

output signal 208 is denoted as o.

System response of audio/video components 205 is denoted as $h_1$.

System response of speakers/display devices 206 is denoted as $h_2$.

System response of sensor 207 is denoted as $h_3$.

filter 203 is denoted as $f^1$.

Overall system response is a function of $h_1$, $h_2$ and $h_3$, or $f(h_1, h_2, h_3)$.

Equation 1: o=applying $f(h_1, h_2, h_3)$ to i.

Equation 2: The goal is to achieve o=i.

Thus, filter 203 should represent the inverse of the overall system response or $f^1(h_1, h_2, h_3)$.

One method in correcting for geometric distortion or finding the $f^1(h_1, h_2, h_3)$ in a display system consists of the following steps: 1) identify a key feature in a test signal; 2) enhance the key feature; 3) feed the test signal through the system; 4) compare the test signal to the output which corresponds to the test signal; 5) identify the pre-identified key feature in the output; 6) compare the placement of the key feature in both the test signal and the output; 7) determine any discrepancy between the two placements; 8) using the key feature as a reference point, calculate any other pixels' misplacements; 9) formulate $f^1 (h_1, h_2, h_3)$ which undoes the errors. It should be noted that similar steps can also apply to color or luminosity distortions.

As has been demonstrated in the above equations and descriptions, when an input signal is modified appropriately, the corresponding output signal can be the same as the input signal.

Figure 5:
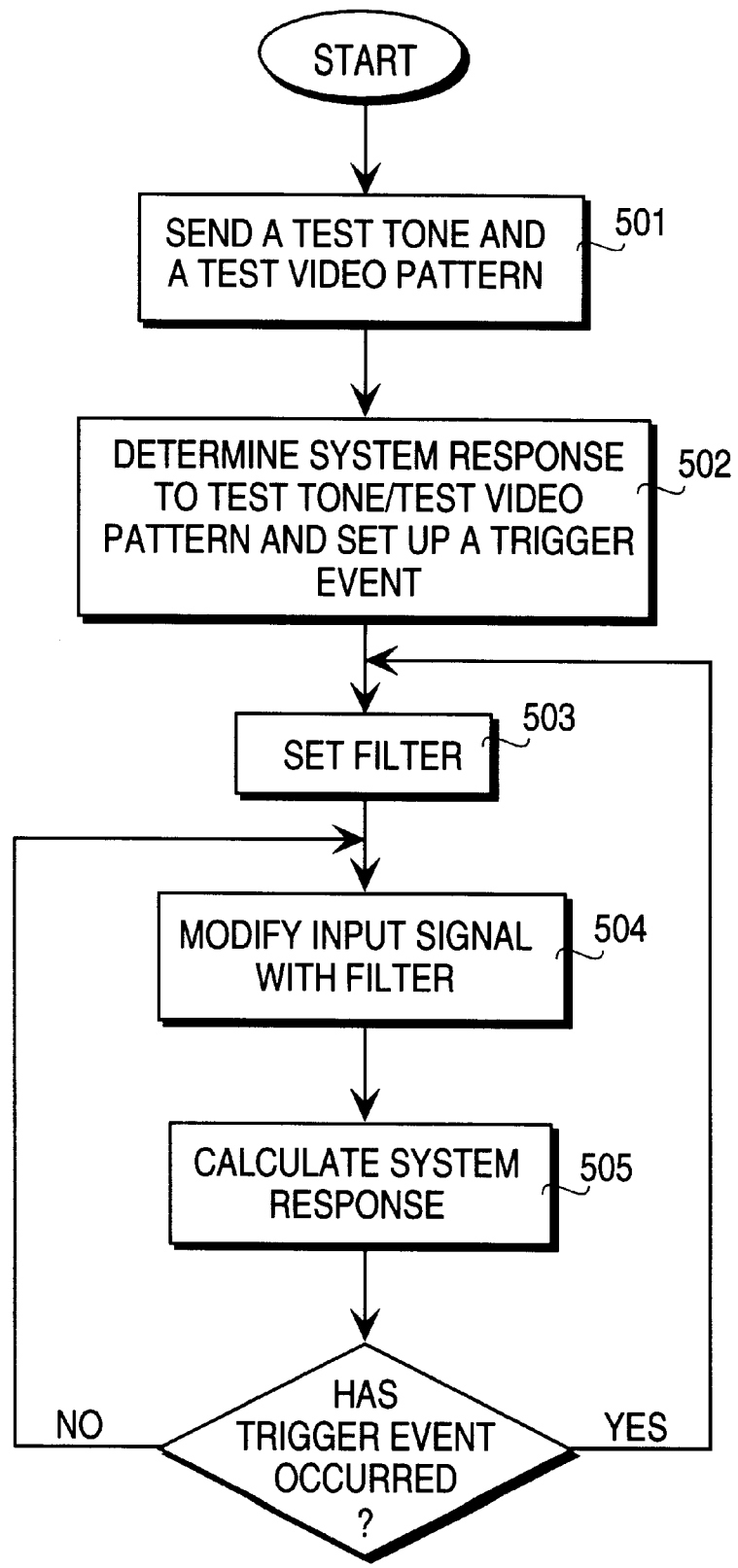
FIG. 5 illustrates a flow chart of one embodiment of the present invention.

FIG. 5 further describes one embodiment of the present invention in a flow chart. In step 501, a test signal is initially sent into audio/video components 205. Once receiver 201 receives the corresponding output 208, system analysis engine 202 divides the frequency response of output 208 by the frequency response of the test signal and establishes the overall system response in step 502. Additionally, a trigger event is determined and activated at this stage. When the trigger event occurs in step 506, filter 203 is adapted to the inverse of the system response computed immediately prior to the occurrence of the trigger event. Some examples of a trigger event are the elapse of predetermined period of time or the happening of pre-determined events. For instance, filter 203 can adapt to a newly computed system response whenever a particular period of time elapses or whenever amplitudes at certain frequencies exceed pre-determined thresholds.

It should be noted, however, the initial system response derivation from test signals in 501 is not limited to a single iteration. Rather, an iterative process using sequences of test signals to calculate the system response can also be used. Moreover, the mechanism of a trigger event is not limited to the above description. The sequence and the manner of establishing and activating a trigger event needs not follow the precise sequence and manner that the above discussion has detailed.

After the trigger event is established, filter 203 is set to the inverse of the initial system response derived from the test signal in step 503. In step 504, subsequent input signals are modified by multiplying the frequency response of input signals to the frequency response of filter 203. Such modification corresponds to Equation 2 from the previous discussions. With new input signals 200, new system responses are calculated in step 505. If the trigger event has not occurred in step 506, filter 203 remains unchanged and continues to modify incoming signals 200.

Although only components 205, 206 and 207 have been identified and described in the signal reproduction path, other components can be added to further mimic the overall system behavior. Such components may be identified in the calibration stages and included to further improve the present invention's effectiveness. Moreover, certain features of the present invention can be part of the audio/video components 205 or any other appropriate components. No specific requirements for maintaining all the discussed features within an apparatus or a general purpose computer is intended.

Thus, a method and process for monitoring and modifying input and output signals of an audio/video system has been disclosed. Although the present invention has been described particularly with reference to the figures, it will be apparent to one of the ordinary skill in the art that the present invention may appear in any of a number of audio/video signal monitoring and modification systems. It is contemplated that many changes and modifications may be made by one of ordinary skill in the art without departing from the spirit and scope of the present invention.

What is claimed is:

1. A method for monitoring an output signal from and modifying an input signal to an audio/video system, the method comprising:

dynamically determining a system response of said audio/video system;

modifying said input signal according to said system response by applying the inverse of said system response to said input signal such that said output signal is an optimal reproduction of said input signal; and after a trigger event has occurred, applying the inverse of a subsequent system response derived immediately prior to said trigger event to input signals immediately subsequent to said trigger event.

2. The method according to claim 1, wherein determining the system response comprises the use of a well-characterized audio/video sensor.

3. The method according to claim 1, wherein determining the system response comprises calculating said system response using frequency responses of said input signal and said output signal.

4. The method according to claim 3 further comprising:

calculating an initial system response using the frequency responses of said output signal and a test signal as said input signal; and calculating subsequent system responses using frequency responses of said input signal to and said output signal from said audio/video system.

5. The method according to claim 1, wherein modifying said input signal comprises multiplying a frequency response of said input signal by the inverse of said system response.

6. The method according to claim 5 further comprising:

initially multiplying a frequency response of said input signal by the inverse of said system response of the test signal; and after a trigger event has occurred, multiplying a subsequent frequency response of said input signal by the inverse of said subsequent system response derived immediately prior to said trigger event.

7. The method according to claim 1, wherein determining the system response further comprises:

calculating an initial system response using a test signal as said input signal; and calculating said system response by comparing said output from said audio/video system to said test signal.

8. An apparatus for monitoring an output signal from and modifying an input signal to an audio/video system, comprising:

means for dynamically determining a system response of said audio/video system;

means for modifying said input signal according to said system response by applying the inverse of said system response to said input signal such that said output signal is an optimal reproduction of said input signal; and after a trigger event has occurred, means for applying the inverse of a subsequent system response derived immediately prior to said trigger event to input signals immediately subsequent to said trigger event.

9. The apparatus according to claim 8, wherein said means for determining the system response includes means for calculating said system response using frequency responses of said input signal and said output signal.

10. The apparatus according to claim 9, wherein said means for determining the system response further comprises:

means for calculating an initial system response using the frequency responses of said output signal and a test signal as said input signal; and means for calculating subsequent system responses using frequency responses of said input signal to and said output signal from said audio/video system.

11. The apparatus according to claim 8, wherein said means for modifying said input signal according to said system response includes means for multiplying a frequency response of said input signal by the inverse of said system response.

12. The apparatus according to claim 10, wherein means for modifying said input signal according to said system response includes:

means for initially multiplying a frequency response of said input signal by the inverse of said system response of the test signal; and after a trigger event has occurred, means for multiplying a subsequent frequency response of said input signal by the inverse of said subsequent system response derived immediately prior to said trigger event.

13. The apparatus according to claim 8, wherein said means for determining the system response includes:

means for calculating the initial said system response using a test signal as said input signal; and means for calculating said system response by comparing said output from said audio/video system to said test signal.

14. An apparatus for monitoring an output signal from and modifying an input signal to an audio/video system, comprising:

a processor;

memory;

a well-characterized sensor;

a receiver to receive said input signal and said output signal;

a transmitter to transmit a modified input signal;

a system analysis engine to dynamically determine a system response of said audio/video system; and a filter to modify said input signal according to said system response such that said output signal is an optimal reproduction of said input signal, said filter is initially equal to the inverse of said system response, and, after a trigger event has occurred, said filter is equal to an inverse of a subsequent system response derived immediately prior to said trigger event.

15. The apparatus according to claim 14, wherein said system analysis engine calculates frequency responses of said input signal and said output signal.

16. The apparatus according to claim 15, wherein said system analysis engine:

calculates an initial system response using the frequency responses of said output signal and a test signal as said input signal; and calculates subsequent system responses using frequency responses of said input signal to and said output signal from said audio/video system.

17. The apparatus according to claim 14, wherein said filter equals to the inverse of said system response.

18. The apparatus according to claim 16, wherein said filter:

initially equals to the inverse of said test signal's system response; and after a trigger event has occurred, the filter equals to an inverse of a subsequent system response derived immediately prior to said trigger event.

19. The apparatus according to claim 14, wherein said system analysis engine:
  calculates the initial said system response using a test signal as said input signal; and
  calculates said system response by comparing said output from said audio/video system to said test signal.

20. The method of claim 1 wherein said system response is the sum of a system response of audio/video components, a system response of speaker/display devices, and a system response of a sensor.

21. The apparatus of claim 8 wherein said system response is the sum of a system response of audio/video components, a system response of speaker/display devices, and a system response of a sensor.

22. The apparatus of claim 14 wherein said system response is the sum of a system response of audio/video components, a system response of speaker/display devices, and a system response of the sensor.

* * * * *

UNITED STATES PATENT AND TRADEMARK OFFICE
CERTIFICATE OF CORRECTION

PATENT NO. : 6,115,476
DATED : September 5, 2000
INVENTOR(S) : O'Conner et al.

It is certified that error appears in the above-identified patent and that said Letters Patent is hereby corrected as shown below:

<u>Title page,</u>
Item [19], delete "O'Conner" and insert -- O'Connor --.
Item [75], delete "O'Conner" and insert -- O'Connor --.

Signed and Sealed this

Fourth Day of June, 2002

Attest:

Attesting Officer

JAMES E. ROGAN
Director of the United States Patent and Trademark Office